US007060653B2

(12) United States Patent
Nakamura

(10) Patent No.: US 7,060,653 B2
(45) Date of Patent: Jun. 13, 2006

(54) METHOD OF PRODUCING GAS OCCLUDING MATERIAL

(75) Inventor: Naoki Nakamura, Suntou-gun (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 528 days.

(21) Appl. No.: 10/125,413

(22) Filed: Apr. 19, 2002

(65) Prior Publication Data

US 2002/0108382 A1 Aug. 15, 2002

Related U.S. Application Data

(62) Division of application No. 09/720,807, filed as application No. PCT/JP99/03530 on Jun. 30, 1999.

(30) Foreign Application Priority Data

Jul. 8, 1998 (JP) .......................................... 10-193363
Jul. 19, 1998 (JP) .......................................... 10-188711

(51) Int. Cl.
*B01J 20/20* (2006.01)
*B01J 20/22* (2006.01)

(52) U.S. Cl. .......................... 502/416; 502/417; 95/90; 95/900; 95/903

(58) Field of Classification Search ............. 423/445 B; 502/416, 417; 95/90, 116, 141, 900, 903
See application file for complete search history.

(56) References Cited

U.S. PATENT DOCUMENTS

| | | | | |
|---|---|---|---|---|
| 2,663,626 A | | 12/1953 | Sprangler | 48/190 |
| 3,151,467 A | | 10/1964 | Cohen et al. | 62/46.3 |
| 3,864,927 A | | 2/1975 | Li | 62/54.3 |
| 4,359,327 A | | 11/1982 | Armand et al. | |
| 4,477,492 A | | 10/1984 | Bergna et al. | 427/215 |
| 4,690,750 A | | 9/1987 | Roxlo et al. | 208/310 Z |
| 5,215,841 A | * | 6/1993 | Scharfe et al. | 430/58.65 |
| 5,292,707 A | * | 3/1994 | Aparicio et al. | 502/418 |
| 5,308,481 A | * | 5/1994 | Stalling et al. | 210/198.2 |
| 5,360,775 A | | 11/1994 | Suda et al. | 502/84 |
| 5,536,893 A | | 7/1996 | Gudmundsson | 585/15 |
| 5,643,843 A | * | 7/1997 | Dunmead et al. | 501/92 |
| 5,648,056 A | * | 7/1997 | Tanaka | 423/445 B |
| 5,761,910 A | | 6/1998 | Tom | |
| 5,846,297 A | | 12/1998 | Schleicher et al. | |
| 6,035,550 A | | 3/2000 | Okui et al. | 34/448 |
| 6,113,673 A | * | 9/2000 | Loutfy et al. | 95/116 |
| 6,177,231 B1 | * | 1/2001 | Ishii et al. | 430/273.1 |

FOREIGN PATENT DOCUMENTS

| | | | |
|---|---|---|---|
| DE | 903 498 | | 2/1954 |
| DE | 36 44 346 | | 2/1987 |
| DE | 36 44 346 | | 5/1987 |
| EP | 0 020 210 | | 12/1980 |
| EP | 0 727 608 | | 8/1996 |
| EP | 0 787 941 | | 8/1997 |
| EP | 0 874 189 | | 10/1998 |
| JP | 51040387 A | * | 4/1976 |
| JP | 62-201361 | | 9/1987 |
| JP | 6-63396 | | 3/1994 |
| JP | 6-192584 | | 7/1994 |
| JP | 7-246334 | | 9/1995 |
| JP | 9-86912 | | 3/1997 |
| JP | 9132580 | | 5/1997 |
| JP | 9-192206 | | 7/1997 |
| RU | 2015990 | | 7/1994 |
| RU | 2036701 | | 6/1995 |
| RU | 2087188 | | 8/1997 |
| RU | 2100313 | | 12/1997 |
| RU | 2108148 | | 4/1998 |
| RU | 2148204 | | 4/2000 |
| WO | WO 96/12551 | | 5/1996 |

* cited by examiner

*Primary Examiner*—Stanley S. Silverman
*Assistant Examiner*—Peter J Lish
(74) *Attorney, Agent, or Firm*—Oblon, Spivak, McClelland, Maier & Neustadt, P.C.

(57) ABSTRACT

The gas storage method comprises a step of keeping a gas to be stored and an adsorbent in a vessel at a low temperature below the liquefaction temperature of the gas to be stored so that the gas to be stored is adsorbed onto the adsorbent in a liquefied state, a step of introducing into the vessel kept at the low temperature a gaseous or liquid medium with a freezing temperature that is higher than the above-mentioned liquefaction temperature of the gas to be stored, for freezing of the medium, so that the gas to be stored which has been adsorbed onto the adsorbent in a liquefied state is encapsulated by the medium which has been frozen, and a step of keeping the vessel at a temperature higher than the liquefaction temperature and below the freezing temperature.

9 Claims, 9 Drawing Sheets

Violanthrone

Naphtho(2,3-a)pyrene

Pyrene

Dibenz(a,h)anthracene 8,16-pyranthrenedione

3-Methylcoranthracene

Dibenzo(b,def) chrysene 7-methylbenz(a) anthracene

Coronene

Anthracene 1,2;8,9-dibebzopentacene

Coranurene

Ovalene

Phthalocyanine

Dibenzo-24-crown 8-ether 1,6,20,25-tetraaza(6,1,6,1) paracyclophane 1-aza-15-crown 5-ether 4,13-diaza-18-crown 6-ether $C_{60}$ (1) Dispersing spacer molecules (2) Forming layer of planar molecules (3) Dispersing spacer molecules (4) Forming layer of planar molecules

METHOD OF PRODUCING GAS OCCLUDING MATERIAL

TECHNICAL FIELD

The present invention relates to a method and system for storage of a gas, such as natural gas, by adsorption, and to a gas occluding material based on adsorption and a process for its production.

BACKGROUND ART

An important issue in the storage of a gas, such as natural gas, is how gas which is at low density under normal temperature and pressure can be efficiently stored at high density. Even among natural gas components, butane and similar gases can be liquefied at normal pressure by pressurization at a relatively low pressure (CNG), but methane and similar gases are not easily liquefied by pressure at normal temperature.

One method that has conventionally been used as a method for storage of such gases which are difficult to liquefy by pressure at near normal temperature, is liquefaction while maintaining cryogenic temperature, as in the case of LNG and the like. With this type of gas liquefaction system it is possible to store a 600-fold volume at normal temperature and pressure. However, in the case of LNG for example, a cryogenic temperature of −163° C. or below must be maintained, inevitably leading to higher equipment and operating costs.

An alternative being studied is a method of storing gas by adsorption (ANG: adsorbed natural gas) without special pressure or cryogenic temperature.

In Japanese Examined Patent Publication No. 9-210295 there is proposed an adsorption storage method for gas such as methane and ethane in a porous material such as activated carbon at near normal temperature, in the presence of a host compound such as water, and this publication explains that large-volume gas storage is possible by a synergistic effect of the adsorption power and pseudo-high-pressure effect of the porous material and formation of inclusion compounds with the host compound.

However, even this proposed method is not able to realize storage density comparable to that of storage methods using cryogenic temperature, such as with LNG.

The use of activated carbon has been proposed as a gas occluding material for storage of gases that do not liquefy at relatively low pressures of up to about 10 atmospheres, such as hydrogen and natural gas (see Japanese Unexamined Patent Publication No. 9-86912, for example). Activated carbon can be coconut shell-based, fiber-based, coal-based, etc., but these have had a problem of inferior storage efficiency (storage gas volume per unit volume of storage vessel) compared to conventional gas storage methods such as compressed natural gas (CNG) and liquefied natural gas (LNG). This is because only pores of a limited size effectively function as adsorption sites among the various pore sizes of the activated carbon. For example, methane is adsorbed only in micropores (2 nm or less), while pores of other'sizes (mesopores: approximately 2–50 nm, macropores: 50 nm and greater) contribute little to methane adsorption.

DISCLOSURE OF THE INVENTION

It is a first object of the present invention to provide a gas storage method and system that can accomplish very high storage density by adsorption without using cryogenic temperatures.

It is a second object of the invention to provide a gas occluding material with higher storage efficiency than activated carbon.

According to the first aspect of the invention for the purpose of achieving the aforementioned first object, there is provided a gas storage method comprising keeping a gas to be stored and an adsorbent in a vessel at a low temperature below the liquefaction temperature of the gas to be stored so that the gas to be stored is adsorbed onto the adsorbent in a liquefied state, introducing into the vessel kept at the low temperature a gaseous or liquid medium with a freezing temperature that is higher than the above-mentioned liquefaction temperature of the gas to be stored, for freezing of the medium, so that the gas to be stored which has been adsorbed onto the adsorbent in a liquefied state is encapsulated by the medium which has been frozen, and keeping the vessel at a temperature higher than the liquefaction temperature and below the freezing temperature.

According to the first aspect of the invention there is further provided a gas storage system characterized by comprising a gas supply source which supplies gaseous or liquefied gas, a gas storage vessel, an adsorbent housed in the vessel, means for keeping the contents of the vessel at a low temperature below the liquefaction temperature of the gas, a gaseous or liquid medium with a freezing temperature which is higher than the liquefaction temperature of the gas, means for keeping the contents of the vessel at a temperature higher than the liquefaction temperature and lower than the freezing temperature, means for introducing the gas from the gas supply source into the vessel and means for introducing the medium into the vessel.

According to the first aspect of the invention there is further provided a vehicle liquefied fuel gas storage system characterized by comprising:

a liquid fuel gas supply station, a fuel gas storage vessel mounted in the vehicle, an adsorbent housed in the vessel, means for keeping the contents of the vessel at a low temperature below the liquefaction temperature of the gas, a gaseous or liquid medium with a freezing temperature which is higher than the liquefaction temperature of the fuel gas, means for keeping the contents of the vessel at a temperature higher than the liquefaction temperature and lower than the freezing temperature, means for introducing the fuel gas from the fuel gas supply station into the vessel and means for introducing the medium into the vessel.

According to the second aspect of the invention for the purpose of achieving the aforementioned second object, there is provided a gas occluding material comprising either or both planar molecules and cyclic molecules. It may also include globular molecules.

In the gas occluding material of the invention, the gas is adsorbed between the planes of the planar molecules or in the rings of the cyclic molecules. It is appropriate for the ring size of the cyclic molecules to be somewhat larger than the size of the gas molecules.

BEST MODE FOR CARRYING OUT THE INVENTION

According to the first aspect of the invention, a gas which is in a liquefied state at cryogenic temperature is encapsulated by a frozen medium to allow freezing storage at a temperature higher than the necessary cryogenic temperature for liquefaction.

The gas to be stored is introduced into the storage vessel in a gaseous or liquefied state. A gas to be stored which is introduced in a gaseous state must first be lowered to a cryogenic temperature for liquefaction, but after it has been encapsulated in a liquefied state with the frozen medium it can be stored frozen at a temperature higher than the cryogenic temperature.

The frozen medium used is a substance which is gaseous or liquid, has a higher freezing temperature than the liquefaction temperature of the gas to be stored and does not react with the gas to be stored, the adsorbent or the vessel at the storage temperature.

By using a medium with a freezing temperature (melting temperature, sublimation temperature) close to room temperature it is possible to realize storage at near room temperature while maintaining the high density exhibited at cryogenic temperature.

Representative examples of such media are substances with a freezing temperature (commonly, "melting temperature") in the range of −20° C. to +20° C., such as water (Tm=0° C.), dodecane (−9.6° C.), dimethyl phthalate (0° C.), diethyl phthalate (−3° C.), cyclohexane (6.5° C.) and dimethyl carbonate (0.5° C.).

The adsorbent used may be a conventional gas adsorbent, typical of which are any of various inorganic or organic adsorbents such as activated carbon, zeolite, silica gel and the like.

The gas to be stored may be a gas that can be liquefied and adsorbed at a cryogenic temperature comparable to that of conventional LNG or liquid nitrogen, and hydrogen, helium, nitrogen and hydrocarbon gases may be used. Typical examples of hydrocarbon gases include methane, ethane, propane and the like.

Figure 3:
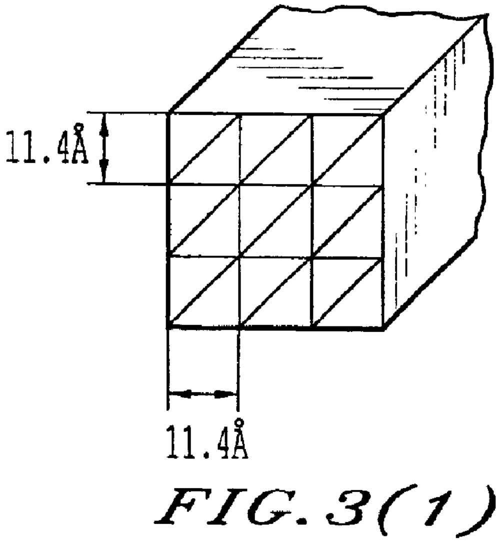
FIG. 3(1) to (3) are schematic drawings showing construction examples for ideal models of gas occluding materials according to the invention.
Figure 3:
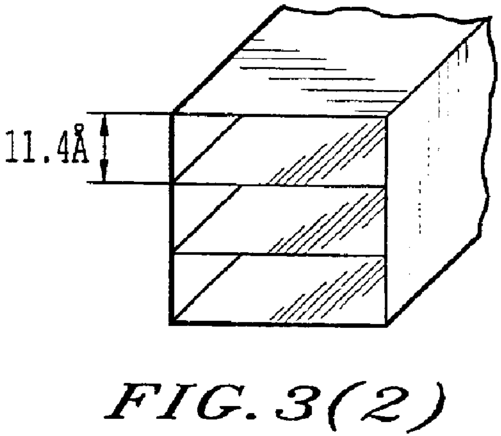
Figure 3:
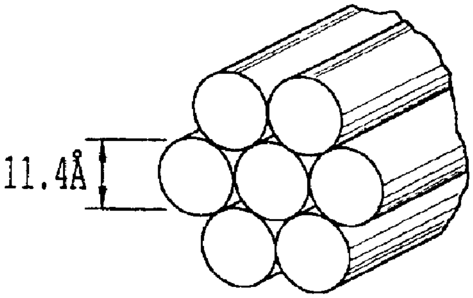

Construction examples for ideal models of gas occluding materials according to the second aspect of the invention are shown in FIG. 3. Based on the carbon atom diameter of 0.77 Å and the C—C bond distance of 1.54 Å, it is possible to construct gaps of ideal size for adsorption of molecules of the target gas. In the illustrated example, an ideal gap size of 11.4 Å is adopted for methane adsorption.

FIG. 3(1) is a honeycomb structure model, having a square grid-like cross-sectional shape with sides of 11.4 Å, and a void volume of 77.6%.

FIG. 3(2) is a slit structure model, having a construction of laminated slits with a width of 11.4 Å, and a void volume of 88.1%.

FIG. 3(3) is a nanotube structure model (for example, 53 carbon tubes, single wall), having a construction of bundled carbon nanotubes with a diameter of 11.4 Å, and a void volume of 56.3%.

Figure 4:
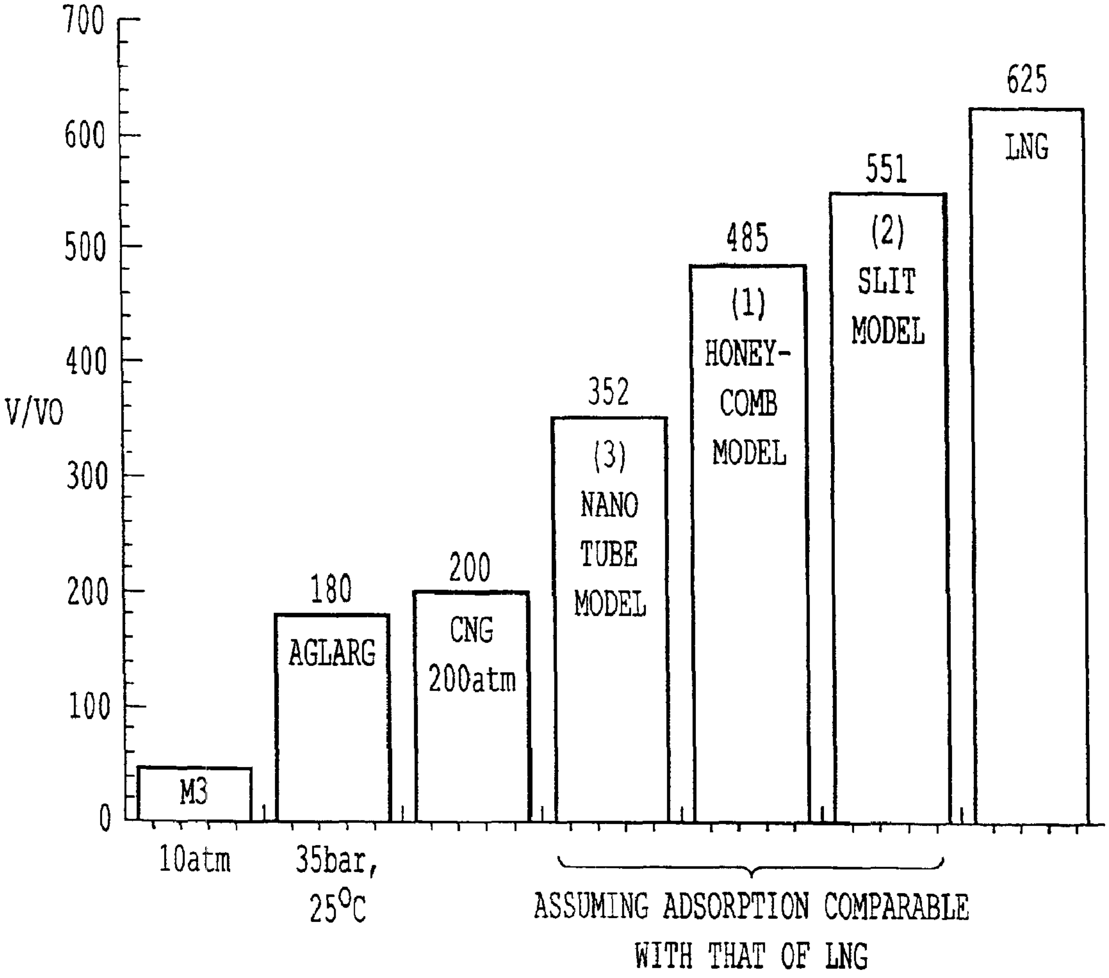
FIG. 4 is a graph showing a comparison of volume storage efficiency V/V0 for the different structural models of FIG. 3 and conventional gas storage systems.

FIG. 4 shows the volume storage efficiency V/V0 for the gas occluding materials of the different structural models of FIG. 3, in comparison to conventional storage systems.

Figure 5:
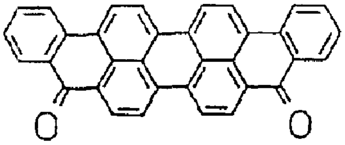
FIG. 5 shows structural formulas for typical planar molecules.
Figure 5:
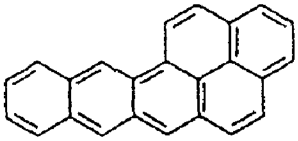
Figure 5:
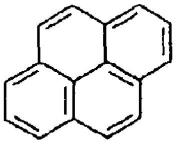
Figure 5:
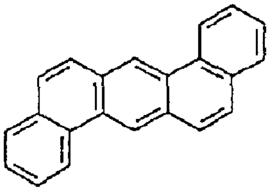
Figure 5:
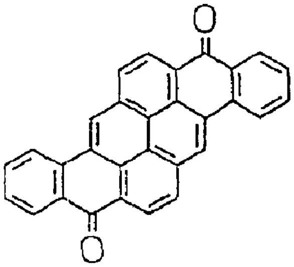
Figure 5:
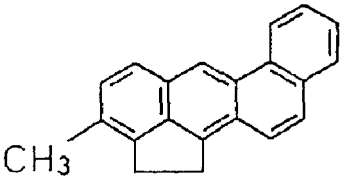
Figure 5:
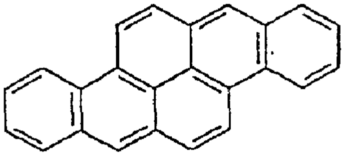
Figure 5:
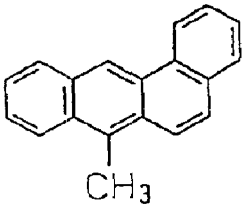
Figure 5:
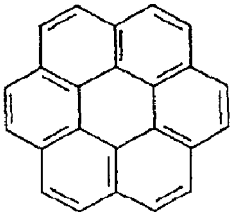
Figure 5:
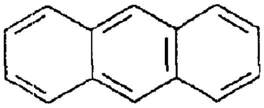
Figure 5:
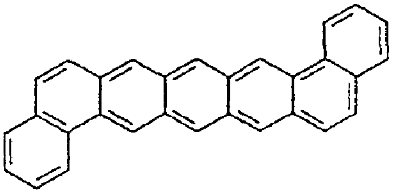
Figure 5:
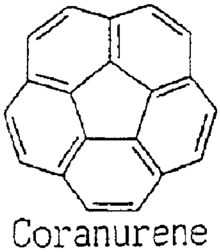
Figure 5:
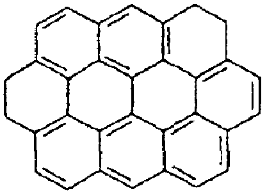

Typical planar molecules used to construct an occluding material according to the invention include coronene, anthracene, pyrene, naphtho (2,3-a)pyrene, 3-methylconanthrene, violanthrone, 7-methylbenz(a) anthracene, dibenz(a,h)anthracene, 3-methylcoranthracene, dibeno(b,def)chrysene, 1,2;8,9-dibenzopentacene, 8,16-pyranthrenedione, coranurene and ovalene. Their structural formulas as shown in FIG. 5.

Figure 6:
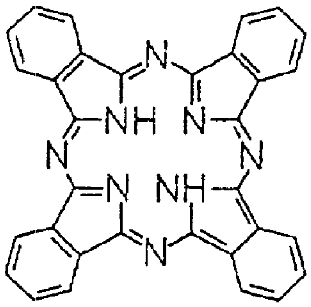
FIG. 6 shows structural formulas for typical cyclic molecules.
Figure 6:
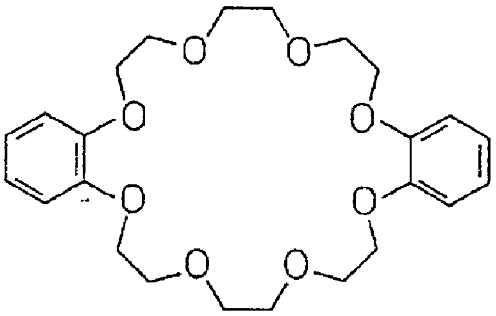
Figure 6:
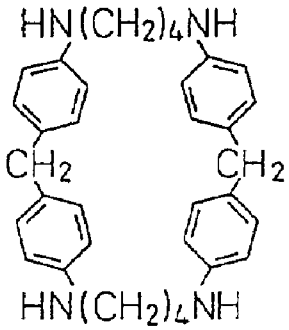
Figure 6:
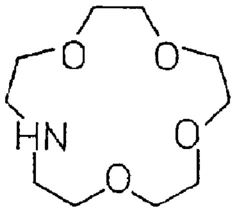
Figure 6:
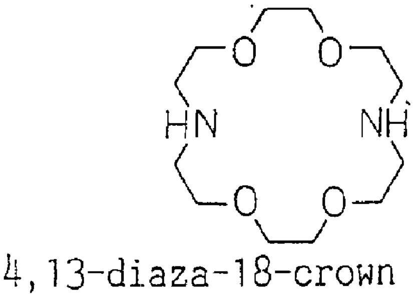

Typical cyclic molecules used include phthalocyanine, 1-aza-15-crown 5-ether, 4,13-diaza-18-crown 6-ether, dibenzo-24-crown 8-ether and 1,6,20,25-tetraaza(6,1,6,1) paracyclophane. Their structural formulas are shown in FIG. 6.

Figure 7:
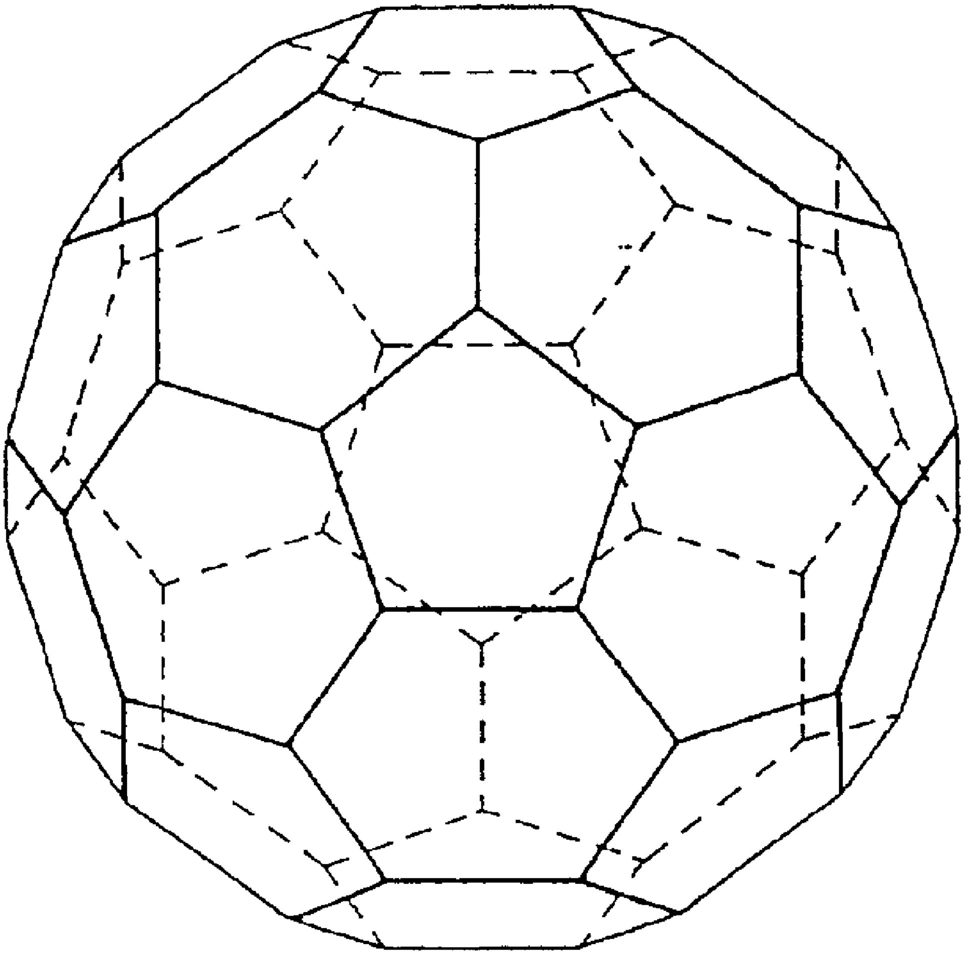
FIG. 7 shows a structural formula for a typical globular molecule.

Typical globular molecules used are fullarenes, which include $C_{60}$, $C_{70}$, $C_{76}$, $C_{84}$, etc. as the number of carbon atoms in the molecule. The structural formula for $C_{60}$ is shown in FIG. 7 as a representative example.

When globular molecules are included, they function as spacers between planar molecules in particular, forming spaces of 2.0–20 Å which is a suitable size for adsorption of gas molecules such as hydrogen, methane, propane, $CO_2$, ethane and the like. For example, fullarenes have diameters of 10–18 ∪, and are particularly suitable for formation of micropore structures appropriate for adsorption of methane. Globular molecules are added at about 1–50 wt % to achieve a spacer effect.

A preferred mode of a gas occluding material according to the invention is a powder form, and a suitable vessel may be filled with a powder of a planar molecule material, a powder of a cyclic molecule material, a mixture of both powders, or any one of these three in admixture with a powder of a globular molecule material.

Application of ultrasonic vibrations to the vessel is preferred to increase the filling density while also increasing the degree of dispersion, to help prevent aggregation between the molecules.

Another preferred mode of a gas occluding material according to the invention is a system of alternating layers of planar molecules and globular molecules. Here, it is preferred for the globular molecules to be dispersed by spraying. Such alternate formation of planar molecule/globular molecule layers can be accomplished by a common layer forming technique, such as electron beam vapor deposition, molecular beam epitaxy (MBE) or laser ablation.

Figure 8:
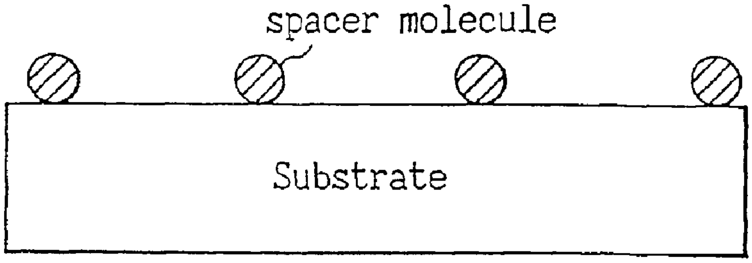
FIG. 8 is a set of conceptual drawings showing a procedure for alternate formation of a planar molecule layer and dispersion of globular molecules.
Figure 8:
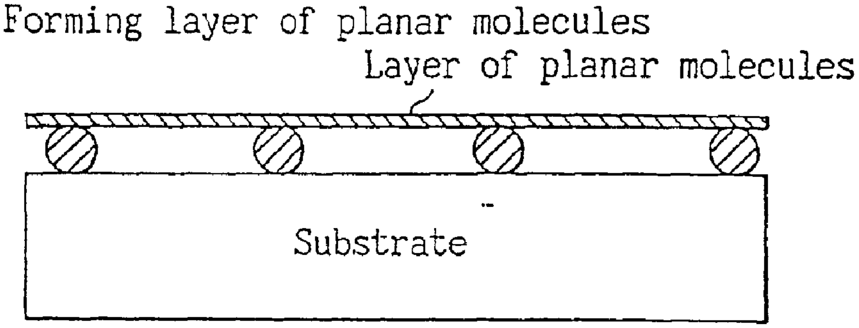
Figure 8:
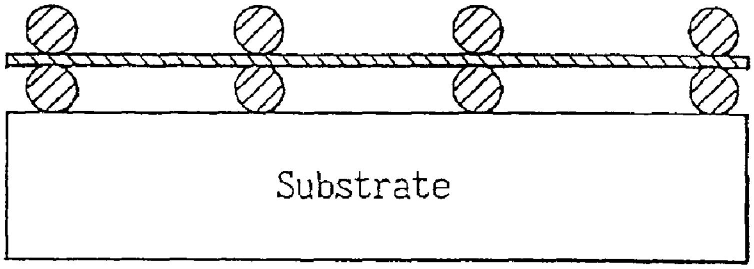
Figure 8:
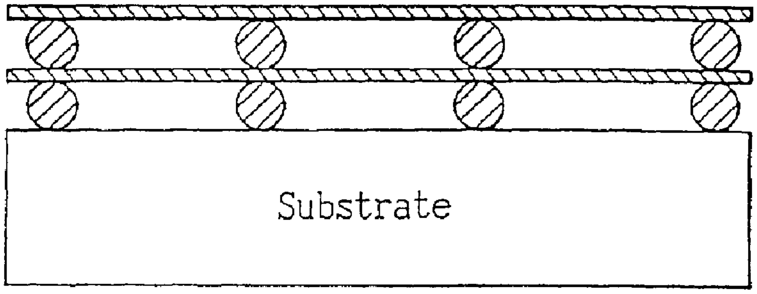

FIG. 8 shows conceptual views of a progressive process for alternate layer formation. First, in step (1) the spacer molecules (globular molecules) are dispersed on a substrate. This can be realized, for example, by distribution accomplished by spraying a dispersion of the spacer molecules in a dispersion medium (a volatile solvent such as ethanol, acetone, etc.). The layer of spacer molecules can be formed by a vacuum layer formation process such as MBE, laser ablation or the like, using rapid vapor deposition at a layer formation rate (1 Å/sec or less) that is lower than the level for the single molecular layer level. Next, in step (2), the planar molecules are accumulated thereover by an appropriate layer forming method so that the individual planar molecules bridge across multiple globular molecules. This forms a planar molecule layer in a manner which maintains an open space from the surface of the substrate. In step (3), the spacer molecules are distributed in the same manner as step (1) on the planar molecule layer formed in step (2). Then in step (4), a planar molecule layer is formed in the same manner as step (2). These steps are repeated thereafter, for formation of a gas occluding material with the necessary thickness.

The planar molecule layer used may be any of the planar molecules mentioned above, or laminar substances such as graphite, boron nitride, etc. Layer-formable materials such as metals and ceramics may also be used.

EXAMPLES

Example 1

Figure 1:
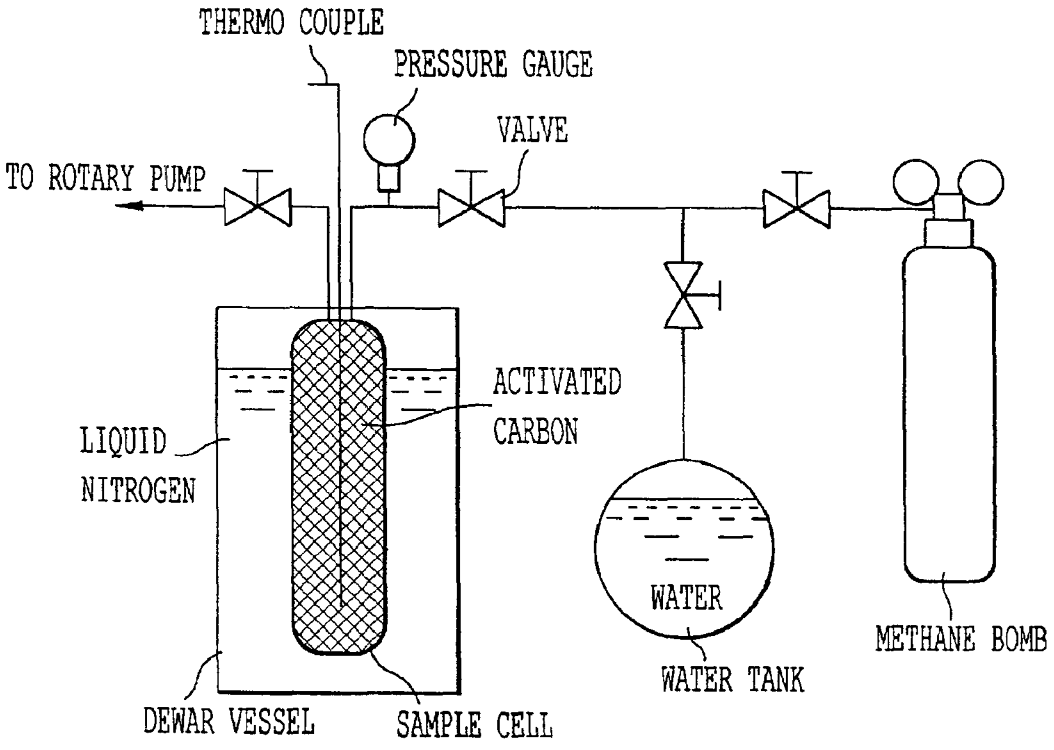
FIG. 1 is a layout drawing showing an example of an apparatus construction for a gas storage method according to the invention.

An apparatus with the construction shown in FIG. 1 was used for storage of methane gas according to the invention by the following procedure.

First, 5 g of activated carbon powder (particle size approximately 3–5 mm ) was loaded into a sample capsule (10 cc volume) having a airtight construction, and the inside of the capsule was decompressed to $1\times10^{-6}$ MPa by a rotary pump.

Methane was then introduced into the capsule from a methane bomb to bring the internal capsule pressure to 0.5 MPa.

The capsule in this state was immersed in liquid nitrogen filling a Dewar vessel, and kept there for 20 minutes at the temperature of the liquid nitrogen (−196° C.).

This liquefied all of the methane gas in the capsule and adsorbed it onto the activated carbon.

The capsule was continuously kept immersed in the liquid nitrogen, and water vapor generated from a water tank (20–60° C. temperature) was introduced into the capsule. This caused immediate freezing of the water vapor to ice by the temperature of the liquid nitrogen, so that the liquefied and adsorbed methane gas was frozen and encapsulated in the ice.

As a comparative example, the steps up to liquefaction and adsorption of the methane were carried out according to the same procedure as for Example 1, but no water vapor was introduced thereafter.

Figure 2:
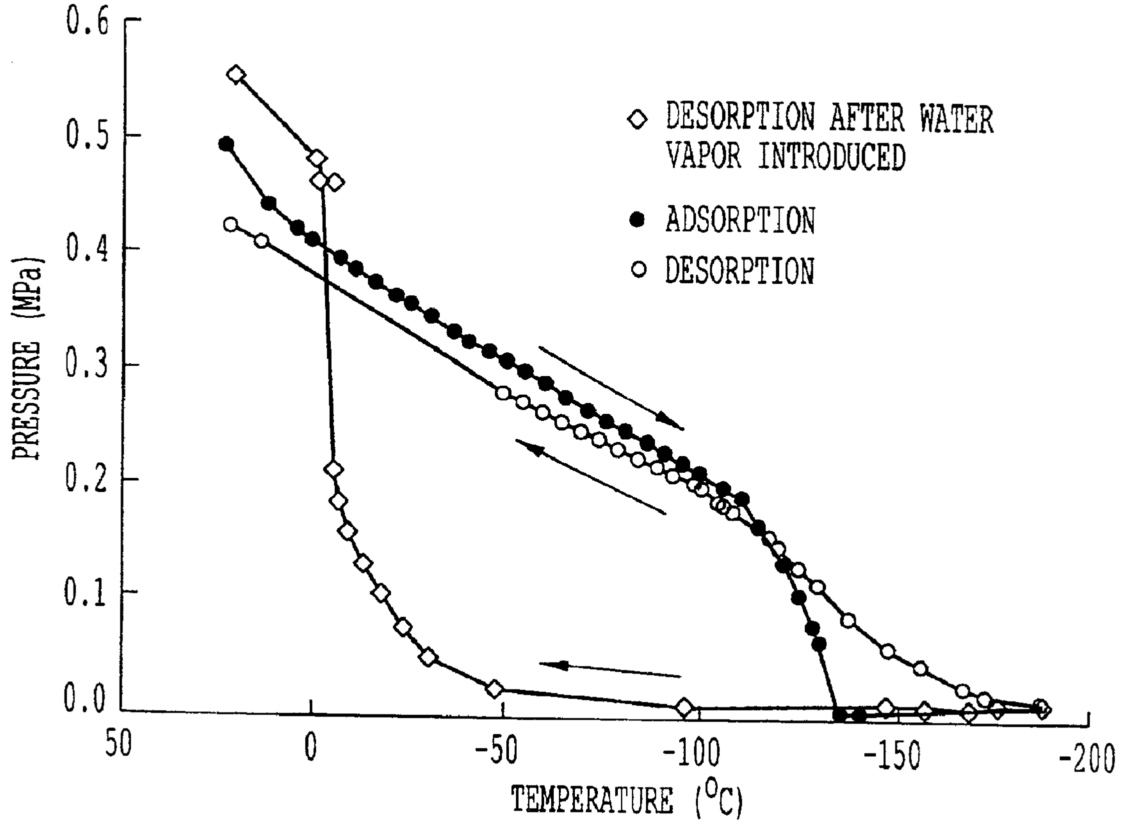
FIG. 2 is a graph showing a comparison between a present invention example and a comparative example in terms of the temperature-dependent desorption behavior of methane gas adsorbed and liquefied at a cryogenic temperature.

FIG. 2 shows the desorption behavior of methane when the temperatures of capsules storing methane according to Example 1 and the comparative example were allowed to naturally increase to room temperature. In the drawing, the temperature on the horizontal axis and the pressure on the vertical axis are, respectively, the temperature and pressure in the capsule as measured with the thermocouple and pressure gauge shown in FIG. 1.

<Process of Adsorption and Liquefaction: For Both Example 1 and Comparative Example (● in FIG. 2)>

When the methane-introduced capsule is immersed in the liquid nitrogen, adsorption proceeds as the temperature inside the capsule falls causing a linear reduction in the internal capsule pressure, and when liquefaction begins the internal capsule pressure falls rapidly to a measured pressure of 0 MPa, while reaching the liquid nitrogen temperature of−196° C.

<Desorption Process: Comparison-Between Example 1 and Comparative Example>

In the comparative example (○ in FIG. 2) wherein no water vapor was introduced after the liquid nitrogen temperature was reached, removal of the capsule from the liquid nitrogen with the resulting temperature increase produced a condition wherein a slight temperature increase to about −180° C. already began to cause methane desorption and initiated a pressure increase.

In contrast, in the example (◇ in FIG. 2) wherein water vapor was introduced according to the invention after the liquid nitrogen temperature was reached to accomplish freezing encapsulation, the desorption detected as an increase in the pressure value occurred only after the temperature had progressed to −50° C., and a substantial portion of the methane remained in an adsorbed state without desorption even up to just under 0° C.

Example 2

Gas storage was carried out according to the invention by the same procedure as in Example 1, except that liquid water from a water tank was introduced into the capsule instead of water vapor, after the liquid nitrogen temperature was reached.

As a result, the same desorption behavior was found as in Example 1 shown in FIG. 2, and low pressure was maintained up to near 0° C.

Example 3

An apparatus with the construction shown in FIG. 1 was used for storage of methane gas according to the invention by the following procedure. However, the gas to be stored was liquefied methane supplied from a liquefied methane vessel, instead of supplying gaseous methane from a methane bomb.

First, 5 g of activated carbon powder (particle size: approximately 3–5 mm) was loaded into a sample capsule (volume: 10 cc) with a sealed construction.

The capsule was immersed directly into a Dewar vessel filled with liquid nitrogen, and kept at the liquid nitrogen temperature (−196° C.) for 20 minutes.

Next, liquefied methane was introduced into the capsule from the liquefied methane vessel. This resulted in adsorption of the liquefied methane onto the activated carbon in the capsule.

The capsule was then kept immersed in the liquid nitrogen, and water vapor generated from a water tank (20–60° C. temperature) was introduced into the capsule.

This caused immediate freezing of the water vapor to ice by the temperature of the liquid nitrogen, so that the liquefied and adsorbed methane gas was frozen and encapsulated in the ice.

Example 4

A gas occluding material according to the invention was prepared with the following composition.

Powder Used

Cyclic molecule: 1,6,20,25-tetraaza(6,1,6,1)paracyclophane powder

Example 5

A gas occluding material according to the invention was prepared with the following composition.

Powder Used

Planar molecule: 3-methylcoranthracene powder, 90 wt % content

Globular molecule: $C_{60}$ powder, 10 wt % content

Example 6

The gas occluding material according to the invention prepared in Example 5 was placed in a vessel, and ultrasonic waves at a frequency of 50 Hz were applied for 10 minutes.

The methane adsorptions of the gas occluding materials of the invention prepared in Examples 4–6 above were measured under various pressures. For comparison, the same measurement was made for activated carbon (mean particle size: 5 mm) and CNG. The measuring conditions were as follows.

[Measuring Conditions]

Temperature: 25° C.

Adsorbent filling volume: 10 cc

Figure 9:
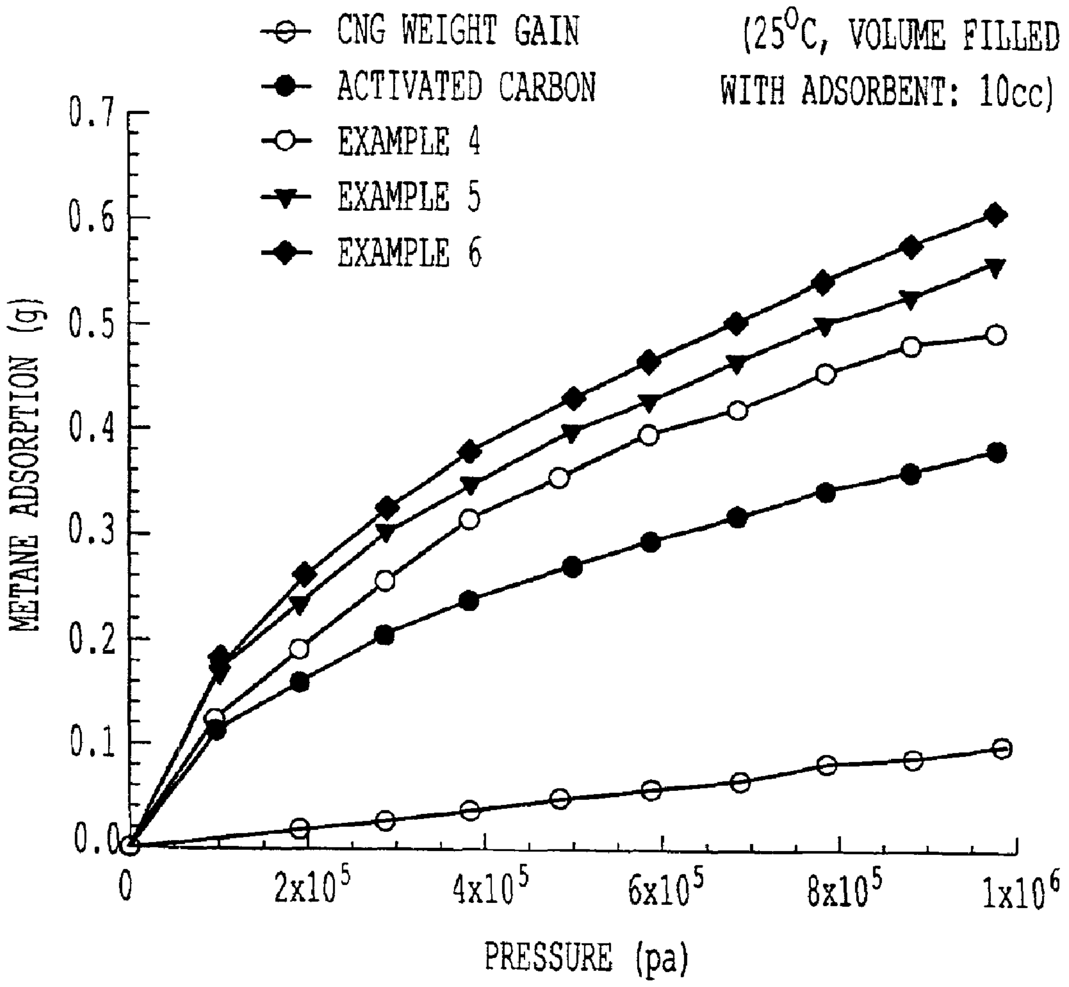
FIG. 9 is a graph showing the results of measuring methane adsorption under various pressures, for a gas occluding material according to the invention and a conventional gas occluding material.

As a result, as shown in FIG. 9, the gas occluding materials prepared in Examples 4, 5 and 6 according to the invention were found to have substantially better methane adsorption than activated carbon. In addition, Example 5, wherein the globular molecules were added, and Example 6, wherein ultrasonic waves were applied, had even better adsorption than Example 4. That is, Example 5 maintained suitable gaps by the spacer effect of the globular molecules, thus exhibiting higher adsorption than Example 4. Also, Example 6 had better filling density and dispersion degree due to application of the ultrasonic waves, and therefore exhibited even higher adsorption than Example 5.

Industrial Applicability

According to the first aspect of the present invention there is provided a gas storage method and system which can accomplish very high density storage by adsorption, without employing cryogenic temperatures.

Because the method of the invention does not require cryogenic temperatures for the storage temperature, storage can be adequately carried out in a normal freezer operated at about −10to 20° C., and thus equipment and operating costs for storage can be reduced.

Moreover, the storage vessel and other equipment do not need to be constructed with special materials for cryogenic temperatures, and therefore an advantage is afforded in terms of equipment material expense as well.

According to the second aspect of the invention there is further provided a gas occluding material with a higher storage efficiency than activated carbon.

What is claimed is:

1. A process of producing a gas occluding material, comprising applying ultrasonic vibrations to a vessel containing a powder of a planar molecule material, a powder of a cyclic molecule material, a mixture of both powders, or any one of these three in admixture with a powder of a globular molecule material, to increase the filling density and dispersion degree, wherein the planar molecule material is selected from the group, consisting of coronene, anthracene, pyrene, naphtho (2,3-a)pyrene, 3-methylconanthrene, violanthrone, 7-methylbenz(a)anthracene, dibenz(a,h)anthracene, 3-methylcoranthracene, dibeno(b,def)chrysene, 1,2;8,9-dibenzopentacene, 8,16-pyranthrenedione, coranurene and ovalene; wherein the cyclic molecule material is selected from the group consisting of phthalocyanine, 1-aza-15-crown 5-ether, 4,13-diaza-18-crown 6-ether, dibenzo-24-crown 8-ether and 1,6,20,25-tetraaza(6,1,6,1)paracyclophane; and wherein the globular molecule material is a fullerene.

2. A process of producing a gas occluding material, comprising alternatingly forming a planar molecule layer and a globular molecule layer, wherein the planar molecule layer comprises a material selected from the group consisting of coronene, anthracene, pyrene, naphtho (2,3-a)pyrene, 3-methylconanthrene, violanthrone, 7-methylbenz(a)anthracene, dibenz(a,h)anthracene, 3-methylcoranthracene, dibeno(b,def)chrysene, 1,2;8,9-dibenzopentacene, 8,16-pyranthrenedione, coranurene and ovalene; and wherein the globular molecule layer comprises a fullerene.

3. A process of producing a gas occluding material according to claim 2, wherein the globular molecules are dispersed by spraying.

4. A process of producing a gas occluding material according to claim 1, wherein the vessel contains said powder of a planar molecule material.

5. A process of producing a gas occluding material according to claim 1, wherein said vessel contains said powder of a cyclic molecule material.

6. A process of producing a gas occluding material according to claim 1, wherein said vessel contains said mixture of a powder of a planar molecule material and a powder of a cyclic molecule material.

7. A process of producing a gas occluding material according to claim 4, wherein the vessel also includes said powder of a globular molecule material in admixture with said powder.

8. A process of producing a gas occluding material according to claim 5, wherein the vessel also includes said powder of a globular molecule material in admixture with said powder.

9. A process of producing a gas occluding material according to claim 6, wherein the vessel also includes said powder of a globular molecule material in admixture with said mixture.

* * * * *

UNITED STATES PATENT AND TRADEMARK OFFICE

CERTIFICATE OF CORRECTION

PATENT NO. : 7,060,653 B2
APPLICATION NO. : 10/125413
DATED : June 13, 2006
INVENTOR(S) : Nakamura It is certified that error appears in the above-identified patent and that said Letters Patent is hereby corrected as shown below:

On the title page, Item (30), the Foreign Application Priority Data Information is incorrect. Item (30) should read:

-- (30) Foreign Application Priority Data

Jul. 8, 1998 (JP) ........................ 10-193363
Jul. 3, 1998 (JP) ........................ 10-188711 --

Signed and Sealed this

Fifteenth Day of August, 2006

JON W. DUDAS
*Director of the United States Patent and Trademark Office*